United States Patent
Bank et al.

(10) Patent No.: US 8,524,156 B2
(45) Date of Patent: Sep. 3, 2013

(54) TUBE BUNDLE REACTOR

(75) Inventors: Rolf Bank, Deggendorf (DE); Dieter Verbeek, Eging am See (DE); Alfons Berndl, Schaufling (DE)

(73) Assignee: Man DWE GmbH (DE)

( * ) Notice: Subject to any disclaimer, the term of this patent is extended or adjusted under 35 U.S.C. 154(b) by 1266 days.

(21) Appl. No.: 12/274,601

(22) Filed: Nov. 20, 2008

(65) Prior Publication Data

US 2009/0163748 A1 Jun. 25, 2009

(30) Foreign Application Priority Data

Dec. 20, 2007 (DE) .......................... 10 2007 061 477

(51) Int. Cl.
  *B01J 8/06* (2006.01)
  *G01K 3/00* (2006.01)
(52) U.S. Cl.
  USPC ........... 422/105; 422/119; 422/652; 422/659; 422/202; 374/137; 374/141
(58) Field of Classification Search
  USPC ................. 422/105, 107, 108, 119, 650, 651, 422/652, 659, 202; 374/137, 141
  See application file for complete search history.

(56) References Cited

U.S. PATENT DOCUMENTS

| | | | | |
|---|---|---|---|---|
| 2,646,681 A | * | 7/1953 | Walton | 374/111 |
| 3,580,078 A | * | 5/1971 | MacKenzie | 374/139 |
| 4,342,699 A | * | 8/1982 | Palmer et al. | 549/259 |
| 4,585,622 A | | 4/1986 | Bowe et al. | |
| 4,595,300 A | * | 6/1986 | Kaufman | 374/170 |
| 7,119,227 B2 | * | 10/2006 | Sakakura et al. | 562/545 |
| 2005/0118088 A1 | | 6/2005 | Olbert et al. | |
| 2006/0284723 A1 | * | 12/2006 | Ha et al. | 338/25 |
| 2007/0116090 A1 | * | 5/2007 | Park et al. | 374/208 |

FOREIGN PATENT DOCUMENTS

| | | | |
|---|---|---|---|
| DE | 101 10 847 A1 | | 9/2002 |
| EP | 0873783 | | 10/1988 |
| EP | 1270065 | | 1/2003 |
| JP | 63319043 A | * | 12/1988 |
| JP | 10036101 A | * | 2/1998 |
| WO | 00/17946 A | | 3/2000 |
| WO | WO 2005/063374 | | 7/2005 |

OTHER PUBLICATIONS

Machine translation for Yamamura et al. (JP 10-036101 A). Feb. 1998.*
European Search Report, Application No. 08019952; Mar. 24, 2009; 3 pages.

* cited by examiner

*Primary Examiner* — Jennifer A Leung
(74) *Attorney, Agent, or Firm* — Thomas & Karceski, P.C.

(57) ABSTRACT

A tube bundle reactor carries out endothermic or exothermic gas phase reactions. The tube bundle of reactor tubes are filled with catalyst, and have their ends fastened tightly in tube sheets (3, 4). A fluid heat carrier (10) flows around the tubes during operation. A shell (5) encloses the tube bundle. A gas inlet head (6) spans one of the tube sheets, and a gas outlet head (7) spans the other tube sheet. The reactor tubes are in fluid communication with the gas inlet and outlet heads (6, 7), and further include at least one stage thermometer (9) installed in a thermometer tube (2) disposed in the tube bundle. The at least one stage thermometer (9) is axially movable inside the thermometer tube (2), and the tube bundle reactor (1) includes a mechanical positioning means (8) to effect the axial movement of the stage thermometer (9). Moreover, a method is proposed for measuring a temperature profile in tube bundle reactors of the kind specified.

16 Claims, 8 Drawing Sheets

TUBE BUNDLE REACTOR

This application claims the priority of German Patent Application Serial No. 10 2007 061 477.4 filed on Dec. 20, 2007.

The invention relates to a tube bundle reactor. The invention also relates to a method of measuring a temperature profile in tube bundle reactors of the kind mentioned.

Tube bundle reactors in particular, as a special type of packed bed reactors, have proved successful in the chemical industry for conducting heterogeneously catalyzed gas phase reactions, such as oxidation, hydrogenation, dehydrogenation, nitration, alkylation processes. Tube bundle reactors of the kind in question are known, for example, from DE 2 207 166 A1. A tube bundle reactor comprises a major reactor portion which includes a bundle of vertically disposed reactor tubes. Catalyst normally in granular form and, if desired, also inert material are received in these reactor tubes which have their ends fixed tightly in upper and lower tube sheets, respectively. The tube bundle is enclosed by a reactor shell. The reaction may be endothermic or exothermic. The reaction gas mixture is fed into the reactor tubes through a reactor head spanning the respective tube sheet and is discharged as a product gas mixture from the reactor tubes through a reactor head spanning the other tube sheet.

Stable reaction conditions are established by circulating a heat carrier around the outer surfaces of the reactor tubes, thereby warranting the best possible heat transfer. When using a heat carrier without phase change that is obtained in fact if it flows in transverse direction against the reactor tubes. In the case of large tube bundle reactors, nowadays often including 30,000 and more reactor tubes, the heat carrier is guided by annular or disc-shaped baffle plates to meander through a ring-shaped tube bundle. Radially uniform heat transfer may be achieved, for instance, by features described in EP 1 569 745 A1. Suitable guidance of the flow, obtained by corresponding design of the flow guide elements or by additional heat carrier circuits, e.g. according to DE 2 201 528 B1 allows a temperature profile, optimized in consideration of the particular process, to be adjusted along the reactor tubes.

A circulating means outside of the reactor distributes the heat carrier through ring channels around the reactor circumference, the heat carrier flowing through a multitude of shell apertures into the shell space of the reactor. The heated heat carrier issuing from the reactor is cooled in a cooler arranged outside of the reactor.

It is essential to detect the temperature within the catalyst bed in axial direction in order to be able to judge the course of the reaction in the reactor and for optimum control of the reaction process in respect of product quality and conversion. With a number of catalytic gas phase reactions, especially with catalytic partial oxidation reactions, increased heat development occurs in the initial zone of the reactor tube causing a temperature maximum, the so-called "hot spot". Knowing the hot spot temperature is extremely important in operation so as to be able to alter the process accordingly in case an admissible temperature is exceeded. Otherwise the catalyst would become damaged, resulting in a loss of conversion, selectivity, and yield.

The temperature of only part of the reactor tubes is measured so that the technical measuring expenditure may be kept within reasonable limits. The conditions of the reactor tubes which are not monitored are derived from those being supervised. That is accomplished by using so-called thermometer tubes. They include temperature measuring instrumentation. Filled with catalyst, these are reactor tubes where the temperature is measured along the flow path in the catalyst bed.

Essentially, two methods are applied to measure the temperature. As a rule, with both methods a protective tube is inserted centrally in the thermometer tube. Subsequently, catalyst is filled into the annular space between the outside wall of the protective tube and the inside wall of the thermometer tube. The protective tube remains in this position. Thereafter, a thermometer is introduced into the protective tube. The thermometer may operate according to various physical principles and may comprise one or more individual temperature measuring points. The most widely used embodiments are resistance thermometers and thermocouples, the latter being preferred. Since thermocouples require only little space, a plurality of individual temperature measuring points may be provided in axial direction.

In the case of the first method, the temperature measuring means consists of a single thermometer which is being displaced axially within the protective tube. This method has the advantage that the diameter to be selected of the protective tube may be very small (e.g. 3.2 mm and smaller) since only one thermometer is needed. In this manner the influence on the reaction process going on in the reactor tube is minimal. The thermometer may be moved to measure any desired location along the reactor tube, thereby allowing the number and places of temperature measurements to be adapted at all times to the reaction under way.

Indeed, this method allows the whole temperature profile along the full length of a reactor tube to be detected throughout. However, the corresponding apparatus must be about as long as the reactor tube and requires specific guide means thus rendering it mechanically very sensitive. For this reason, the method is applied only in connection with smaller laboratory and pilot reactors. Moreover, the temperature profile can be measured only with a stationary operating condition as the thermometer must rest for a while at each measuring position so that it may assume the temperature of the new measuring position. If, for example, the thermometer measures the temperature at one end of the thermometer tube during start-up of the reactor or upon variation of the process parameters the temperature at the other end may have changed completely in comparison with the first measurement. If the full range is run through too quickly the result may be that none of the temperatures is detected correctly because the period of temperature adaptation was too short for any measuring point. Moreover, the movable thermometer is sensitive and expensive both to be installed and operated. Therefore, it is not suitable for use in large-scale commercial tube bundle reactors.

With the second method, a plurality of thermometers disposed axially at fixed equal or unequal spacings are introduced into the protective tube. The preferred thermometers with this embodiment are thermocouples. For mechanical protection, the plurality of thermometers often are arranged in a "heat protection tube". This multiple axial arrangement of thermometers is referred to as "multipoint thermometer" or "stage thermometer", abbreviated below as STM. The STM supplies the temperatures of all the individual measuring positions at the same time. With reactions involving marked extreme temperature positions, the thermometers usually are arranged at smaller spacings from each other so as to cover the critical ranges as accurately as possible.

The second method including the application of an STM is disadvantageous in that a certain cross sectional area is required for the many thermometers and, consequently, the diameter of the surrounding heat protection tube is greater than in the case of the first method applying the displaceable single thermometer. As the diameter of the protective tube increases, the release of heat from exothermic reactions in the interior of the thermometer tube diminishes and, therefore, the temperatures measured there correspond ever less to the temperatures in reactor tubes not furnished with temperature measuring instrumentation.

It is another disadvantage that no information is available regarding the temperatures between two axially neighboring thermometers inside an STM. The situation is improved by smaller spacings, but the disadvantage is not removed because the area of the hot spot may be relatively small, having a length of no more than about 10 mm to 60 mm, so that it may remain undiscovered. Besides, the catalyst ages with time and that may cause the hot spot to travel into zones where the spacings between adjacent thermometers are greater.

It is attempted, with either method, to find the smallest possible diameter of the heat protection tube and the protective tube, respectively, so that substantially the same reaction conditions may develop as in the reactor tubes without temperature measuring equipment. Furthermore, the diameter of the thermometer tube, and thus of the annular space which contains the catalyst filling, may be enlarged somewhat to compensate for the tube cross sectional area occupied by the protective tube of the STM.

It is customary to distribute the thermometer tubes in representative fashion across the tube bundle cross section so as to get an overview also of the different temperature situations in radial direction of the tube bundle.

Simple structural embodiments of stage thermometers are described, for example, in U.S. Pat. No. 4,075,036 B or in DE 10 2005 023 869 A1 (=U.S. Pat. No. 7,175,343 B2). In contrast to these two publications, the individual thermocouples in an embodiment according to U.S. Pat. No. 4,385,197 B are connected to the wall of the protective tube by thermally conductive spring members. Rather big diameters are needed for such designs and, therefore, the space requirement is great. They are not suitable for installation in thermometer tubes in which reactions take place.

Use of a stage thermometer in a tube bundle reactor is described, for instance, in EP 1 484 299 A1. With the method described in that publication a stage thermometer is introduced into a protective tube disposed in a thermometer tube and measures the temperatures at various fixed points. The spacings between the individual thermometers either may be the same all over or they may be smaller in the initial zone. This stage thermometer is movable in that it is insertable for installation into a thermometer tube rather than being firmly built-in. Once inserted, the individual thermometers are distributed throughout the full tube length and associated with fixed locations along the tube. In operation, the temperature is measured exclusively at these fixed locations; displacement does not take place.

Stage thermometers normally are designed as stage thermocouples. A great variety of embodiments thereof are offered by various manufacturers.

EP 0 873 783 A1 describes a tube bundle reactor and a method of temperature measurement in a tube bundle reactor, the relationship between the mass of solid particles and the free cross sectional area, and the pressure loss of the thermometer tube and of the reaction tube without installations being the same. That is achieved by solid particles of different sizes and/or different geometries. The temperature measuring means proper either is an axially displaceable individual thermocouple or alternatively a stage thermometer with fixed measuring positions, both being provided in a respective protective tube.

A similar method is described in EP 1 270 065 A1 from which the preamble starts. With this method, equal losses of pressure are obtained in the reactor tubes and in the thermometer tubes by filling solid particles of equal size into both the reactor tubes and the thermometer tubes and feeding the solid particles to the thermometer tubes at a lower speed. The method is provided not only for thermometer tubes but also for pressure measuring means. The measuring means, optionally, are arranged in protective tubes on the tube axis and are either axially movable or provided in greater numbers at fixed spacings, such as described in EP 0 873 783 A1. The measuring means are supported by vibration dampers on the inside wall of the thermometer tube.

U.S. Pat. No. 4,342,699 B1 describes a process of preparing maleic acid anhydride, with catalyst activity rising stepwise and a special way of guiding gas in a circle. In the description of the reactor chosen general reference is made to the use of a thermometer tube. The way in which the temperature is measured is not specified in detail. In the test arrangement made to prove the specific effects of the method claimed, a single reactor tube is used which includes an axially movable stage thermocouple mounted in a protective tube. This movable stage thermocouple is known only in connection with a test reactor equipped with a single reactor tube, no details being given as to the structure or operation thereof.

The publication WO 00/17946 A2 introduces a procedure in tube bundle reactors by means of which thermal "runaway" of a reaction can be recognized. It resides in furnishing a reactor with a plurality of thermometer tubes which contain individual or stage thermometers. Part of these thermometer tubes are provided with throttle members to decrease the flow rate through the same. As the thermometer tubes including the throttle members are less able to dissipate heat of reaction they reveal a runaway of the reaction more quickly than the thermometer tubes not provided with throttle members. The reaction is carried out at the desired conditions of reaction. A comparison of the differences between the temperature profiles of the two types of thermometer tubes can tell whether or not there are indications of a thermal runaway of the reaction.

This method is disadvantageous in that the reaction in the thermometer tubes may run away simply because with them the flow rate is reduced, while the reactions in all the other reactor tubes follow their normal course. That lowers the availability. Moreover, information is missing as regards the temperatures between the individual thermometers within an STM. The temperature profiles obtained, therefore, are not really representative.

A displaceable stage thermometer used with a reactor comprising thermal sheet metal plates is known from WO 2005/063374 A1. Here, the temperature determined in one or more gaps at one or more measuring locations distributed throughout the height of each gap between two thermal sheet metal plates is selected as the control signal to monitor, control and/or regulate reactions. In one embodiment there is a stage thermocouple inside a protective tube which is disposed between two thermal sheet metal plates. The stage thermocouple preferably is provided with equidistant measuring points and is adapted to be displaced continuously in the protective tube for measuring the temperature profile. Nothing is said about the manner in which this stage thermocouple is displaced, especially not in an industrial commercial reactor.

It is an object of the invention to improve the resolution as well as the rate of measurement of a temperature profile along the axial flow direction in a tube bundle reactor of the kind specified initially. It is also an object of the invention to provide a method which will provide the improvement mentioned.

The object is met, according to the invention, with a tube bundle reactor as specified herein. The object likewise is met by a method as recited herein.

Preferred embodiments are presented in the dependent claims.

The measures according to the invention allow the temperature profiles in a bed of solids and/or in the heat carrier to be determined in flow direction at high resolution, using compact measuring equipment with mechanical actuating means. Due to the use of stage measuring thermometers (STM) the path of movement for recording the full temperature profile along the entire measuring range is reduced to the spacing between two adjacent thermometers x(TM).

Providing the thermometer tubes with mechanical actuators makes it possible not only to carry out a great number of precise, representative temperature measurements simultaneously in a plurality of thermometer tubes but also to accomplish these temperature measurements from a control center not positioned directly on the reactor.

The simultaneous availability of detailed temperature distributions in axial and radial directions (when a plurality of thermometer tubes are disposed radially throughout the tube bundle) offers quick action to be taken, such as measures to change the volume flow or concentration.

The particle bed suffers little disturbance and thus the influence on the reactions taking place in the particle bed is little, and it is getting less and less as the selected diameter of the protective tube becomes smaller. In this context, the limitation of the feasible number of thermometers and the respective extension of the working traverse (i.e. displacement) of the mechanical positioning unit must be taken into consideration.

The tube bundle reactor according to the invention represents a commercially useful production reactor which normally yields rather great quantities of a product, in contrast to a reactor in a laboratory or technical institute where the task, in the first place, is to study and optimize processes in respect of their parameters.

Particularly, a tube bundle reactor according to the invention is suitable for carrying out catalytic gas phase reactions. This is so without any restrictions as to single or multi-zone designs.

Also, with a tube bundle reactor according to the invention, there are no limitations as to the usual dimensions of the reactor diameter, reactor height, number, arrangement, length, diameter of the tubes, guidance of the heat carrier or type of heat carrier.

With a tube bundle reactor according to the invention there are no restrictions as far as the heat carrier is concerned which circulates in it. Basically, any known heat carrier may be used, e.g. heat carrier oil. The preferred heat carrier, however, is a heat carrier salt. The choice is determined in dependence on the desired optimum process temperature. The heat carrier is supplied by a circulating means disposed outside of the reactor and then distributed through annular ducts around the reactor circumference where it flows through a plurality of shell apertures into the shell space of the reactor. These windows in the shell are dimensioned, for example according to DE 16 01 162 A1, such that the sum of pressure loss from the flow in the annular duct and the passage through the shell apertures is constant for all threads of stream. That assures uniform distribution of the heat carrier around the circumference of the shell and uniform radial entry into the shell space of the tube bundle reactor. The determination of the cross sectional dimensions, derived from the measurable pressure loss, is applied in the same way to the exiting of the heat carrier through the shell apertures at the outlet of the tube bundle reactor. Applying known laws of flow mechanics, the shell apertures at the inlet end in the direction of flow become ever smaller, while the shell apertures at the outlet end in the direction of flow become ever greater. This principle is supplemented, in WO 2006/118387 A1, by an additional slotted wall having uniform slit openings for further equalization of the flow. The heated heat carrier exiting from the reactor is cooled in a cooler located outside of the reactor. This variety of structural measures provide the basic conditions for optimum operation.

The number of tubes normally lies in a range of between 1,000 and 45,000, preferably between 10,000 and 40,000, especially preferred being between 20,000 and 38,000 tubes. The length of the tubes lies in range of between 2 m and 18 m, preferably between 3 m and 16 m, especially preferred being between 4 m and 10 m. As a general rule, heat transfer from inside the reactor tube to the heat carrier flowing around the reactor tube is the better the smaller the reactor tube diameter. At a given cross sectional area for a catalyst bed that, of course, increases the number of tubes and thus the investment cost. Widening the reactor tube diameter lowers the required number of reactor tubes and investment cost. On the other hand, however, heat conduction from the interior of the reactor tube to the reactor tube wall suffers and, as a result, the temperature rises, whereby conversion, selectivity, and yield are lowered and/or the catalyst becomes damaged. The final selection of the reactor tube diameter depends greatly on the respective process. The inner diameter of the reactor tubes lies in a range of between 16 mm and 50 mm, preferably between 20 mm and 40 mm. Also, greater diameters of up to 110 mm have proved to be advantageous for certain reactions.

The tube bundle reactor design may be a single-zone or multi-zone structure. In the multi-zone structure at least one horizontal partition divides the heat carrier space into at least two separate heat carrier spaces in which temperatures may be adjusted that differ from each other. Optimum adaptation to the respective process is obtainable by providing the reactor tubes and thermometer tubes, respectively, per zone with different adequate fillings. Another possibility of achieving a plurality of separate heat carrier spaces resides in connecting, for example, two reactors with each other in such a way that their tube sheets come to lie directly opposite each other or with a small distance between them. Further subdivision of heat carrier spaces may be obtained if the overall process is performed in a plurality of tube bundle reactors connected in series and interconnected by pipelines.

The instant invention by no means places limits on the temperature measuring principle. For instance, all the thermocouples defined in DIN 43710 and DIN EN 60584 are suitable, depending on the respective process conditions. Thermocouples of type K according to DIN EN 60584 are preferred. Moreover, other physical temperature measuring principles may be applied as well, e.g. platinum resistance thermometers, such as PT-100 or PT-1000, resistance thermometers, or semiconductor sensors.

According to the invention, however, the stage thermometers preferably are designed as stage thermocouples. A widely used embodiment of such a stage thermocouple consists of a plurality of individual thermocouples arranged in parallel and differing in length. Each individual thermocouple has its own leads to the evaluation unit. A thermocouple is a special kind of thermometer having two different thermo electric wires with their free ends joined. Different temperatures prevailing at the junctions will generate an electrical current that may be utilized for measuring the temperature.

For control and/or monitoring of the reaction temperatures in the reactor tubes, a number of thermometer tubes filled with catalyst, referred to below as KAT thermometer tubes, are distributed throughout the reactor cross section. In this manner, the temperatures in the reactor can be detected as accurately as possible in axial and radial directions. The number of such thermometer tubes depends on the requirements of the process in question, on the specific structural design, and on the total number of reactor tubes, and is determined by the plant operator. There may be reasons for equipping only part of these thermometer tubes with axially displaceable STMs and the others with stationary STMs. According to the invention, however, the share of thermometer tubes including axially displaceable STMs in the total number of thermometer tubes, with stationary or with axially movable STMs, is less than 100%, preferably less than 50%, especially preferred being less than 10% but, at any rate, at least one such tube.

A thermometer tube filled with catalyst has a flow cross section which differs from that of a reactor tube because of the temperature measuring means installed inside it. An influence hereof on the course of the reaction is unavoidable. The temperature measured in such a thermometer tube, therefore, can never correspond precisely to the temperature in a reactor tube. For this reason, a number of known measures are taken in an attempt to minimize the deviations of values measured in such a thermometer tube.

The STM is arranged and guided in a protective tube so as to be freely movable in axial direction. The protective tube is inserted as far as possible into the thermometer tube so that the temperatures in the thermometer tube may be measured as completely as possible in axial direction, usually as far as the catalyst support. Commercially available spacers or centering means are provided for substantially centering the protective tube in radial direction on the tube axis. The preferred embodiments chosen are those which have the least influence on the flow and on the particle bed; these are in particular springs, e.g. helical springs, having outwardly directed straight or bent springs. In principle, the STM also may be introduced from below into the reactor tube. Yet that involves an inconvenience in that the protective tube must be pushed through the catalyst support. For this reason it is preferred to introduce the protective tube, including the STM from above into the thermometer tube.

Preferably, the STM in the protective tube is installed in a heat protection tube and this heat protection tube is freely movable in the protective tube.

The thermometer inside the protective tube is a sensitive measuring instrument. It is placed in an axially movable heat protection tube in order to give it mechanical stability and prevent it from becoming damaged mechanically during movements. The distance of the heat protection tube from the inside wall of the protective tube is selected to be as small as possible so that the temperature prevailing at the protective tube may be detected most accurately and without delay. Nevertheless, the spacing must be great enough for the heat protection tube to be movable freely in the protective tube.

If a stage thermometer STM is to have the temperature measuring points of a plurality of thermometers located axially spaced in a heat protection tube, the individual thermo electric wires must be insulated with respect to one another and also from adjacent thermometers. Additionally, mechanical stability against deformation and damage is required of the thermo electric wires. That is achieved by surrounding each thermometer with a thermo sleeve. Inside the thermo sleeve there is insulation material by which the thermo electric wires are insulated electrically from each other and from the wall of the thermo sleeve.

Once the protective tube has been installed, the catalyst particles and, if desired, inert particles usually are filled manually into the thermometer tube. To facilitate mounting, it is provided according to the invention that the protective tube be held by a detachable connection between the tube sheet and the mechanical positioning means. Such a detachable joint, for example, may be offered by a flange, a clamping ring, cutting ring or a bayonet-type link.

The protective tube, when located centrally inside the thermometer tube, presents an additional tube wall. As a consequence, movability along the wall (wall effect) becomes greater while, at the same time, the bulk density of the catalyst or inert material particles in between the walls diminishes. All of which affects the course of the reaction. For this reason, the smallest possible protective tube diameter is aimed at with a view to limiting the influence of the protective tube within the thermometer tube. The fact that the STM is displaceable makes it possible to address a plurality of measuring points of a conventional STM, whereby equipment can be saved. In view of the smaller number of thermometers, the required overall cross section for the STM becomes smaller. Consequently, the diameter of the heat protection tube in turn may be reduced and along with it the diameter of the protective tube as well. If, nevertheless, a great number of thermocouples are chosen the axial distance between adjacent thermometers is reduced. The working traverse becomes shorter, the mechanical positioning means becomes smaller, and the resolution increases. On the other hand, the differences become more distinct between the flows in the thermometer tube and in the reactor tube. In any case, a smaller number of thermometers may be selected for the same number of axial measuring points than would be the case with an STM in fixed position. In each individual case, the advantages and disadvantages of the number and axial spacing of thermocouples must be weighed. For example, the tube length, the structural dimensions of the mechanical positioning means, or the ratio between the cross section of the protective tube and the cross section of the flow cross section of a reactor tube must be taken into account.

Although heat conducting contact between the individual thermometers and the surrounding protective tube is desirable, it plays a minor role in the present embodiment in view of the small radial dimensions. Quick heat transfer is obtained because of the small wall thicknesses and gap dimensions of the embodiment according to the invention. This is enhanced still further by heat radiation which gains in importance at temperatures in the order of several hundred degrees Celsius.

A thermometer may be chosen from a series of standardized types of thermometers, for example, from a selection including diameters of 0.25 mm, 0.34 mm, 0.5 mm, and 1.0 mm. The greater the diameter, the greater the stability and longevity of the thermometer. With smaller diameters, more thermometers may be housed in a heat protection tube. Thermometers having a diameter of 0.2 to 0.4 mm are preferred.

The number of individual thermometers in one STM depends on the length of the thermometer tube, the desired resolution, the admissible error due to particle displacement, and the minimum diameters available of thermometers. A small number of thermometers means lower STIM costs. On the other hand, the mechanical positioning means must be bigger and thus more expensive. Vice versa, a greater number of thermometers means a short working traverse and consequently a mechanical positioning means of corresponding smaller dimensions and lower cost. According to the invention, the stage thermometer comprises a number of thermometers in the order of between 2 and 50, preferably between 4 and 40, especially preferred being between 6 and 30 and more preferred between 8 and 21 thermometers.

Depending on the diameters and number of thermometers, the diameter of the heat protection tube preferably lies in the range of from 2.0 to 4.0 mm. The wall thickness of the heat protection tubes lies in the range of from 0.1 to 1.0 mm. In this manner, e.g. 21 thermometers having a diameter of 0.25 mm may be positioned inside a protective tube having an outer diameter of 3.6 mm. True, such an STM is delicate to mount, but it is very robust in operation and its service life is comparable to that of STMs furnished with greater diameter thermometers.

The protective tube into which the STM is introduced has an outer diameter in the range of from 3.0 mm to 8.0 mm, preferably in the range of from 3.2 mm to 6.0 mm. The wall thickness lies in the range of from 0.5 mm to 1.5 mm, preferably in the range of from 0.8 mm to 1.2 mm. Its preferred location is radially centrally in the thermometer tube.

Uniform distance from the inside wall of the thermometer tube is established by spacers. The spacers may be of any kind available on the market. The preferred spacers are of the type of springs e.g. helical springs having tangentially extended tips at both ends terminating at the tubular inside wall. Such a structure has the advantage that it cannot break, is readily adaptable, easy to mount, and practically does not obstruct the filling-in of the catalyst particles. The plant operator is the one to decide especially on the number of thermometers in accordance with his criteria.

As described above, the choice of the smallest possible diameter protective tube in comparison with the diameter of the thermometer tube is meant to result in as little disturbance of the flow as possible. Yet this value never can be zero. Therefore, the type of catalyst bed is to be selected in such a way from methods known in the art that the conditions of reaction in the thermometer tubes and in the reactor tubes will be most similar.

The catalyst and inert particles, respectively, are chosen in consideration of the respective reaction. The reactions may be exothermic or endothermic. Examples of suitable processes, for instance, are oxidation reactions, partial oxidation reactions, dehydrogenations, hydrogenations, oxidating dehydrogenations. Among the partial oxidation reactions, phthalic acid anhydride from o-xylene, (meth)acrolein from propene or propane, and/or (meth)acrylic acid from (meth)acrolein should be mentioned specifically. Depending on their nature, these processes may be performed in a single-zone reactor, a multi-zone reactor, or in a plurality of reactors connected in series.

The catalyst and inert particles, respectively, used in these processes are not limited as to shape. Frequently used forms of particles are of the Raschig ring type, Pall ring type, particles of saddle shape or spheres. They are made use of as solid type catalysts, i.e. the catalysts consist entirely of catalyst material. For economic reasons, however, They are often replaced by so-called shell-type catalysts. The latter have a catalytically active coating applied according to a known method on the surface of a carrier body. The particles preferred for use have the greatest possible surface area at the lowest possible pressure loss for a given tube inside diameter while, at the same time, offering the best possible heat transfer to the inside wall of the tube. The preferred carrier bodies for this catalyst material are made of ceramics or stainless steel. While it is normally possible to fill the reactor tube mechanically, the thermometer tubes, as a rule, are filled by hand. The pressure loss upon filling the reactor tubes and the thermometer tubes is mutually harmonized by known methods.

The stage thermometer, received in the protective tube, is moved from measuring position to measuring position preferably automatically by the positioning means. Automation of the positioning procedure is advantageous in particular with great commercial production reactors equipped with a great number of thermometer tubes where there is inadequate acessibility of the STM for frequent manual control of the mechanical positioning means. In accordance with the invention, automation is achieved by providing the STM with a teletransmission means to transmit measured values to a remote control center. The control center disposes of means for the reception and further processing of the measurement signals and also of means for control of the mechanical positioning means.

There is no limitation as to the type of mechanical positioning means. It may be embodied by a pneumatic or hydraulic drive means, or a drive motor may be used which operates via transmission gears or spindles. A stepping motor is chosen in the case of the invention. The stepping motor preferably is a linear motor. This type of apparatus has the advantage that it is the drive unit itself which performs the positioning so that neither transmissions nor gears are required.

The character of the mechanical positioning means is such that it may be driven through a plurality of steps and holding positions either by manual control and/or a control program. In other words, any point within the working traverse as defined by the construction can be reached.

The stage thermometer according to the invention is designed to accomplish the complete temperature measurement at least to the extent that the thermometer tube is filled with catalyst. The catalyst range normally extends within the tube portion cooled by the heat carrier. If this tube portion comprises n sections, therefore, at least n thermometers are needed. They are moved through a working traverse from one end of the catalyst area to the other. Furthermore, a additional thermometer may be mounted at the other end to provide verification measurements.

Advantageously, the distances in axial direction between adjacent individual thermometers within one stage thermometer are the same. That facilitates not only manufacture and use of the STM but also makes it easier to evaluate the results of measurements.

If required, it is likewise conceivable for the individual thermometers of the stage thermometer to be disposed at smaller spacings within the area of the hot spot than the other thermometers. In this manner, the areas of neighboring thermometers are subjected to multiple measurements. The redundant mode of operation permits a comparison of various temperature measurements.

In an advantageous further development of the invention the mechanical positioning means is designed such that the maximum working traverse of the stage thermometer (xmax) is as much as 300%, preferably up to 200%, especially preferred being 100% of a thermometer spacing x(TM). This design has the advantage that, for example, double measurements are offered at least of the ends of a thermometer spacing between adjacent thermometers in case there is 100% agreement between the maximum working traverse and the thermometer spacing. If the values of the measurements are the same it may be assumed that the measuring instruments are gauged well, and thus the measurement results are very reliable. If there is a great difference between the values measured at one measuring point either the gauging of the measuring instruments is poor, or they are defective, or the process is not stationary. The apparatus itself thus possesses self-monitoring properties.

The mechanical positioning means often is employed in explodable atmospheres. According to the invention, therefore, it is made explosion-proof in line with the safety requirements which are applicable at the place of erection.

Being aware of the heat carrier temperature is an advantage for checking the course of the reaction. A tube bundle reactor according to the invention, therefore, is equipped with an additional thermometer tube, including a stage thermometer, for measuring the temperature of the heat carrier. This STM does not measure the temperature in the interior of a thermometer tube but instead the temperature of the inside wall of the thermometer tube. This means that the interior structure of the thermometer tube in this case is different. To simplify distinguishing between the two thermometer tubes, the thermometer for measuring heat carrier temperatures will be referred to below as "WT thermometer". A common feature of both thermometer tubes is a protective tube surrounding the STM which is inserted in the protective tube and, if desired, also axially movable within the same. The protective tube is sealed to the upper tube sheet at the level of the upper surface of the tube sheet so that gas cannot enter into the WT thermometer tube. The sealing preferably is obtained by a detachable connection. The functioning principle applied may be that of a stuffing box (gland) seal, or a mechanism with which two ring wedges are displaced with respect to each other to close the annular gap between the inside wall of the tube and the protective tube, or a device including wedges which will close the annular gap by widening a ring-shaped portion, or a variant of a clamping ring threaded connection the force of which acts radially outwardly.

In a simple embodiment, the STM used in the WT thermometer tube is identical with the STM in the KAT thermometer tube described above for measuring the temperatures within a catalyst bed. The space between the protective tube and the WT thermometer tube is filled with a material which is a good heat conductor, such as aluminum in granular form. This material is filled into the WT thermometer tube in the same way as the catalyst particles are filled into a KAT thermometer tube, making use of a particle retention means. Following the filling, the protective tube is tightly sealed against the tube sheet to prevent explodable gases from accumulating in the WT thermometer tube and make sure that the temperature of the heat carrier is measured rather than that of the reaction gas. Penetration of product gas from below into the WT thermometer tube may be prevented by an optional purging line fitted in the seal between the protective tube and the upper tube sheet to introduce inert gas. Not much volume flow is required as the only purpose is to prevent the product gas from entering the WT thermometer tube. Such a measure may be taken readily since almost all of the components needed are known. It is a disadvantage, however, that the thermometers do not measure precisely the temperature normal to the axis of the WT thermometer but instead a mixed temperature resulting from heat conductance in axial direction above and below the temperature normal to the axis.

Especially accurate measurement of the heat carrier temperature is obtained by having a guide tube arranged inside the WT thermometer tube. Resilient elements which are good heat conductors are located at axial and radial spacings along the guide tube to keep heat conductive contact with the inside wall of the WT thermometer tube. The thermometers proper are disposed on the resilient elements, thus allowing accurate measuring of the temperature. Signal lines pass through the inside of the heat protection tube and out of the reactor. The protective tube preferably is attached by releasable connections to the WT thermometer tube and to a continuing protective tube portion next to it. Also the heat protection tube is joined to the guide tube by detachable connections.

If the temperature difference of the heat carrier in axial direction of the reactor amounts to only a few degrees it would be disproportionate to measure the temperature by a displaceable STM. As a rule, use of a stationary STM may suffice in such a case.

The protective tube preferably comprises at least two parts which are releasably interconnected within the gas inlet or outlet heads, particularly in the head which presents the upper reactor head.

If the protective tube is designed in several parts that permits easy assembly and disassembly of the temperature measuring means and the upper reactor head. During assembly, for instance, the lower part of the protective tube is inserted first into the thermometer tube. Then the upper reactor head, possibly including the previously mounted upper protective tube is placed on the major body of the reactor and connected to the same. The upper part of the protective tube then is joined to the lower part of the protective tube. Thereafter the heat protection tube is introduced from above into the protective tube. The mechanical positioning means is brought into place, and the mechanical and electrical connections are made with the heat protection tube. It is also possible for the heat protection tube, including the stage thermometers and connections to be joined to the mechanical positioning means prior to assembly. Mounting them separately, however, is preferred for reasons of handling. At a suitable point in time between the mounting steps described, the catalyst is filled into the KAT thermometer tubes and the reactor tubes. Disassembly is carried out by the same procedures in opposite order.

According to an advantageous modification of the invention, the protective tube is closed at its end remote from the mechanical positioning means. This measure contributes greatly to reducing the manufacturing expenditure and thus makes the industrial utilization of the invention much more economical.

The invention likewise relates a method of measuring a temperature profile in a tube bundle reactor according to the invention. In the instant application, the term "temperature profile" is to be understood as referring to a plurality of discrete adjacent measured temperature values, the spacings between the measuring points (step width) being selectable at random and the smallest spacing depending on the preciseness of the mechanical positioning means.

To begin with, in preparing a temperature measurement, the structural features of the STM are laid down. First, the minimum measuring range is fixed in accordance with the criteria mentioned above. Subsequently, there are two alternative ways of proceeding: either the spacing between the individual thermometers x(TM) is fixed and then the number of individual thermometers determined, or the number of individual thermometers is fixed first and then the spacing between the individual thermometers x(TM) is determined. Following that, the resolution of the series of measurements is decided. That is expressed by the magnitude of a section $\Delta x$ which is calculated as $\Delta x = 1/n^* \; x(TM)$, wherein x(TM) equals the spacing between two adjacent thermometers and n is an integral number greater than 1. The magnitude of the section $\Delta x$ may be selected as small as desired, depending nevertheless on the desired resolution, the maximum capacity of resolution of the positioning means, and the overall duration acceptable of a full measuring run. In the extreme, the spacings between two measuring positions may be so small that a quasi continuous temperature curve may be recorded. In this case, however, the total time one measuring run lasts will become very long. If distinct process variations are noted within the total time period then either the number of measuring positions must be reduced or the halt at each measuring position be shortened, or both. These parameters cannot be fixed precisely in advance. They are dependent on the particular process and must be redefined for each individual situation. The temperature measurement data are transmitted according to the invention either via a signal line or by radio to a remote control and evaluation unit.

Following the above, a working traverse within which to measure the temperatures is set in accordance with the criteria mentioned above. The working traverse preferably comprises at least 100% of the spacing x(TM) between two thermometers. For better reliability of the measurement results, the working traverse of the STM may be selected to be one or more sections $\Delta x$ greater than one TM spacing x(TM), whereby the measuring ranges of two thermometers slightly overlap. This offers an easy way of checking the temperature measurements of two adjacent thermometers. The individual component parts of the instrumentation and evaluation means are dimensioned accordingly and installed. Before mounting the STM in the reactor, the individual thermometers of the STM are gauged.

Once installed, the STM is positioned by defining a known position as reference point for positioning control. In an initial procedure, the temperature measurement is performed by causing the mechanical positioning means to move the STM into a start position so that a thermometer disposed at the end of an STM will be located at least at the level of one end of the catalyst bed. Then the temperatures are taken in a series of measurements. The individual working steps taken within a series of measurements always are the same.

First, the temperature at the start position is recorded. More specifically, this means that the STM remains in this position until the temperature no longer varies substantially, in other words until the rate of change of the temperature is sufficiently small. Usually, a 100% approximation of the final value is not necessary. The time period up to this point depends on the step width from one measuring position to the next. It is preferred to carry out these procedures by manual control at first. When sufficient experience has been gathered regarding the assimilation behavior of the temperatures a corresponding program is written to be carried out automatically afterwards. The non-stationary conditions during start-up and shut-down of the tube bundle reactor, on the one hand, and the stationary operation, on the other hand, likewise must be taken into account. The mechanical positioning means subsequently moves the STM on by one section $\Delta x$. At this new measuring position again the temperature is recorded according to the criterion mentioned above, and so on until the temperatures of the entire working traverse have been determined. As each individual thermometer is advanced by the distance of one working traverse all the temperatures of the entire range measured will have been detected at the resolution of one section $\Delta x$. Based on these data, next the temperature extremal value is determined. With an exothermic reaction this will be the highest temperature, while it will be the lowest temperature with an endothermic reaction.

With the method according to the invention, the order in which the series of measurements are carried out is not limited. The starting and terminating points as well as the requirements to be met by the measurements of a temperature profile are set by the plant operator according to process specific aspects. For example, the positioning unit may move the STM, through the procedural steps described, from an upper start position to a lower end position. Then, in the next pass the STM will be moved upwardly from this position so as to measure the temperatures accordingly from the bottom to the top. With another mode of operation, the STM is moved by the same individual procedures described to measure the temperature from an upper start position to a lower end position. Thereafter, the STM is returned swiftly without performing temperature measurements to the upper start position, and measuring of the temperature is repeated as described. Irrespective of the mode of operation chosen, the temperature measurement data always are transmitted via a signal line or radio to a remote control and evaluation unit. Within this evaluation, the temperature maximum ("hot spot") is determined either manually or automatically. This information may be used within a safety concept to release an alarm when an admissible maximum temperature value is exceeded.

In another method of measuring a temperature profile in a tube bundle reactor according to the invention the temperature measurement is further optimized. With this embodiment, the temperature first is measured in a quick run covering a small number of measuring positions and/or reduced time for measuring at each measuring position throughout the working traverse. Subsequently, the extremal value is determined and, starting from that value, a fine measuring range at either side of the same is fixed in which the temperature profile is determined more precisely in smaller sections $\Delta x$ during respective measuring periods which are at least as long as during the first run.

More specifically, the method is carried out in such a way that the STM is moved to a start position by the mechanical positioning means in accordance with the principles explained above, the working traverse is passed at the spacing of a section $\Delta x = 1/n^* \, x(TM)$, where n is an integral number between 1 and 50, in fractional operating steps of:

waiting until the temperature has become sufficiently assimilated to a final value, i.e. until
the rate of change of the temperature has fallen short of a predetermined value or,
alternatively, setting a corresponding time interval;
moving the STM by the width of a section to the next stop position;
repeating the individual fractional operating steps up to the end of the working traverse.

Subsequently, the extremal value of the temperature is determined—being the highest temperature in the case of an exothermic reaction and the lowest temperature in the case of an endothermic reaction. Starting from the extremal value, a fine measuring range at either side of the same is fixed in which the temperatures are determined at smaller sections $\Delta x$ during respective measuring periods which are at least as long as during the first run. The fine measuring range is covered from one edge to the other.

Process safety may be enhanced by performing the procedures automatically with the assistance of a program, apart from manual control.

Besides the tube bundle reactors described here, also adiabatic and isothermic solid (i.e. fixed) bed reactors or mixed types thereof as well as plate reactors may be designed in the same fashion The invention will be described further, by way of example, with reference to the accompanying drawings, in which.

Figure 1:
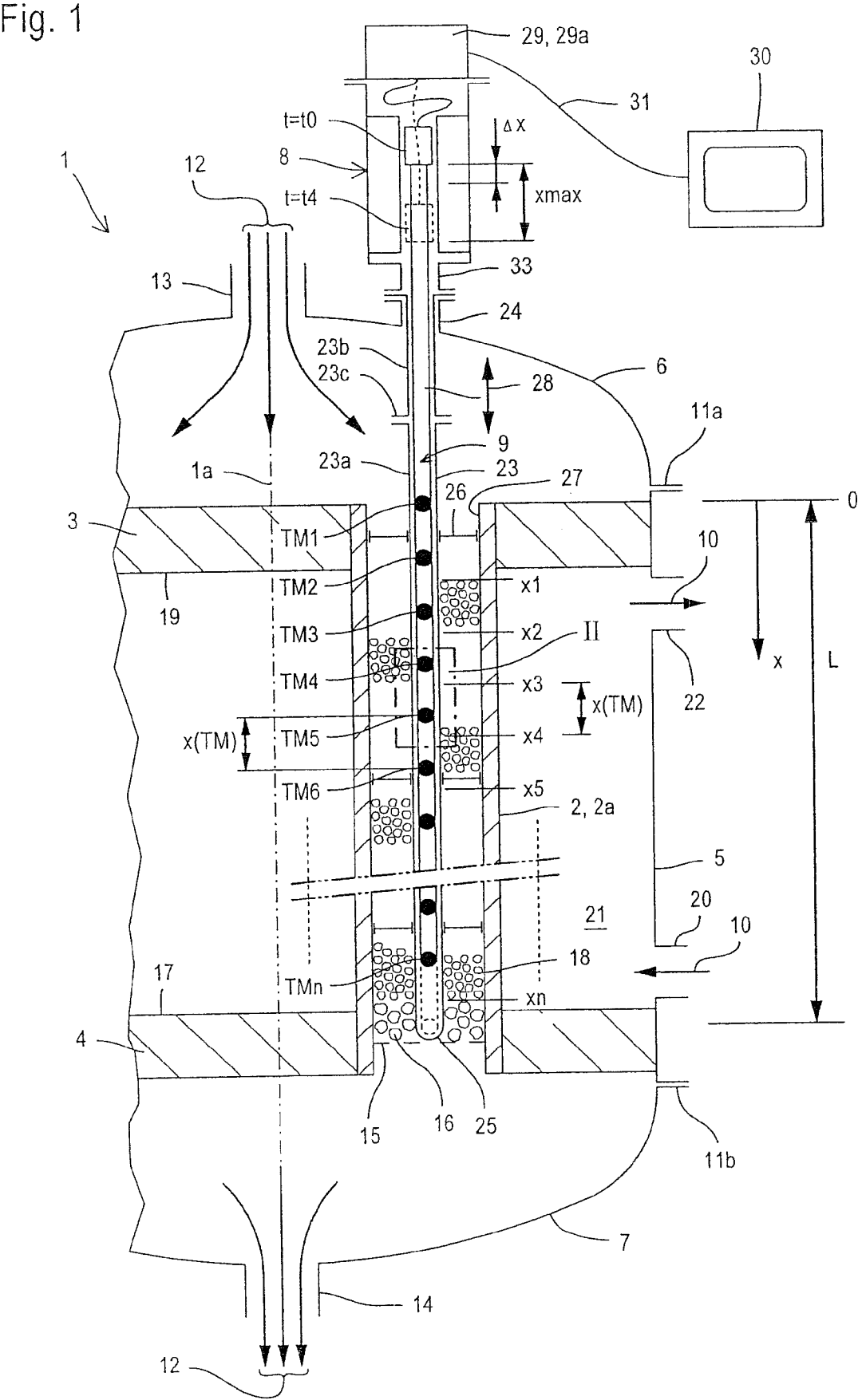
FIG. 1 is a vertical part sectional view of an embodiment of a tube bundle reactor according to the invention, comprising a KAT thermometer tube, shown on an enlarged scale.
Figure 3A:
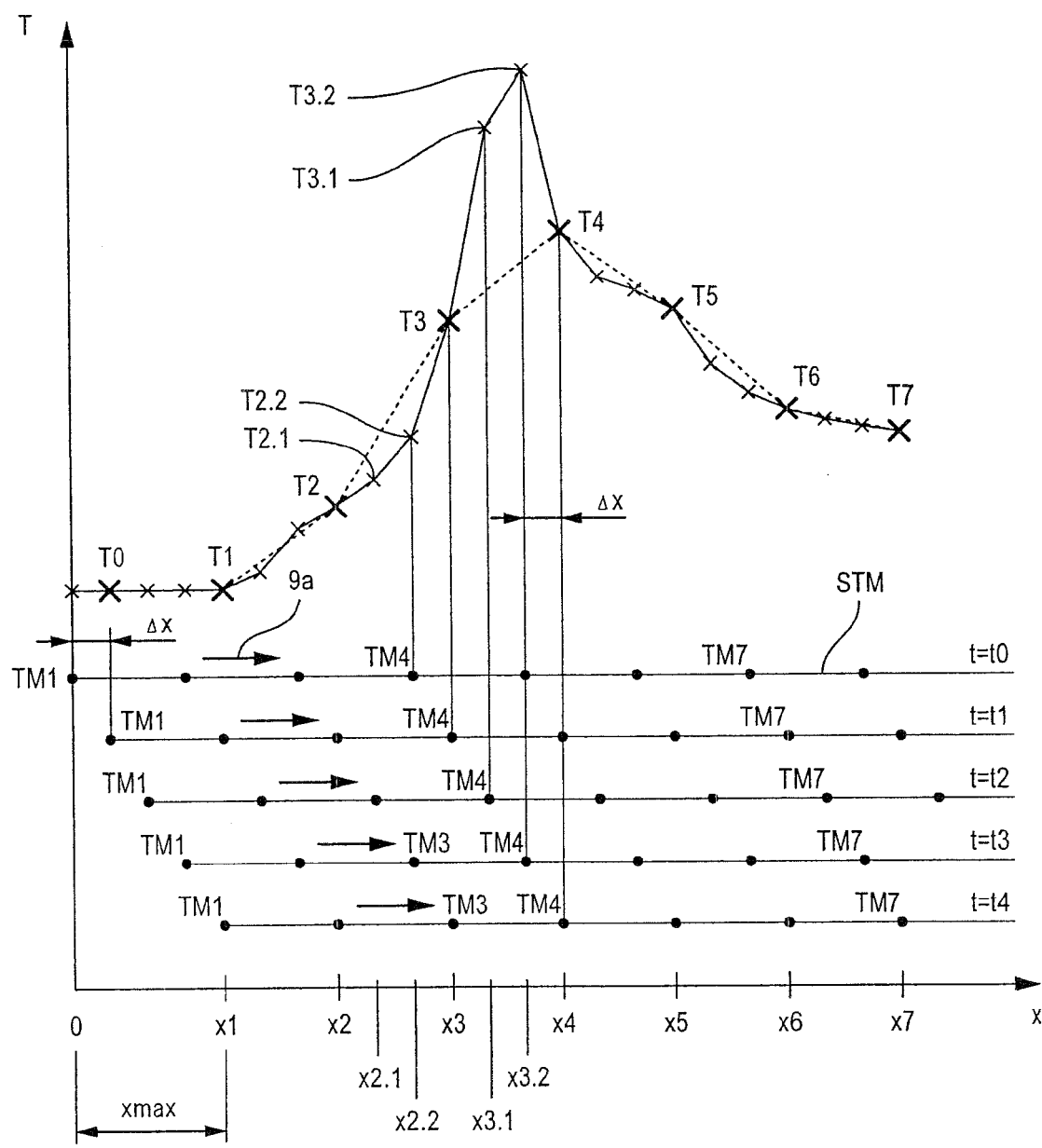
Figure 3B:
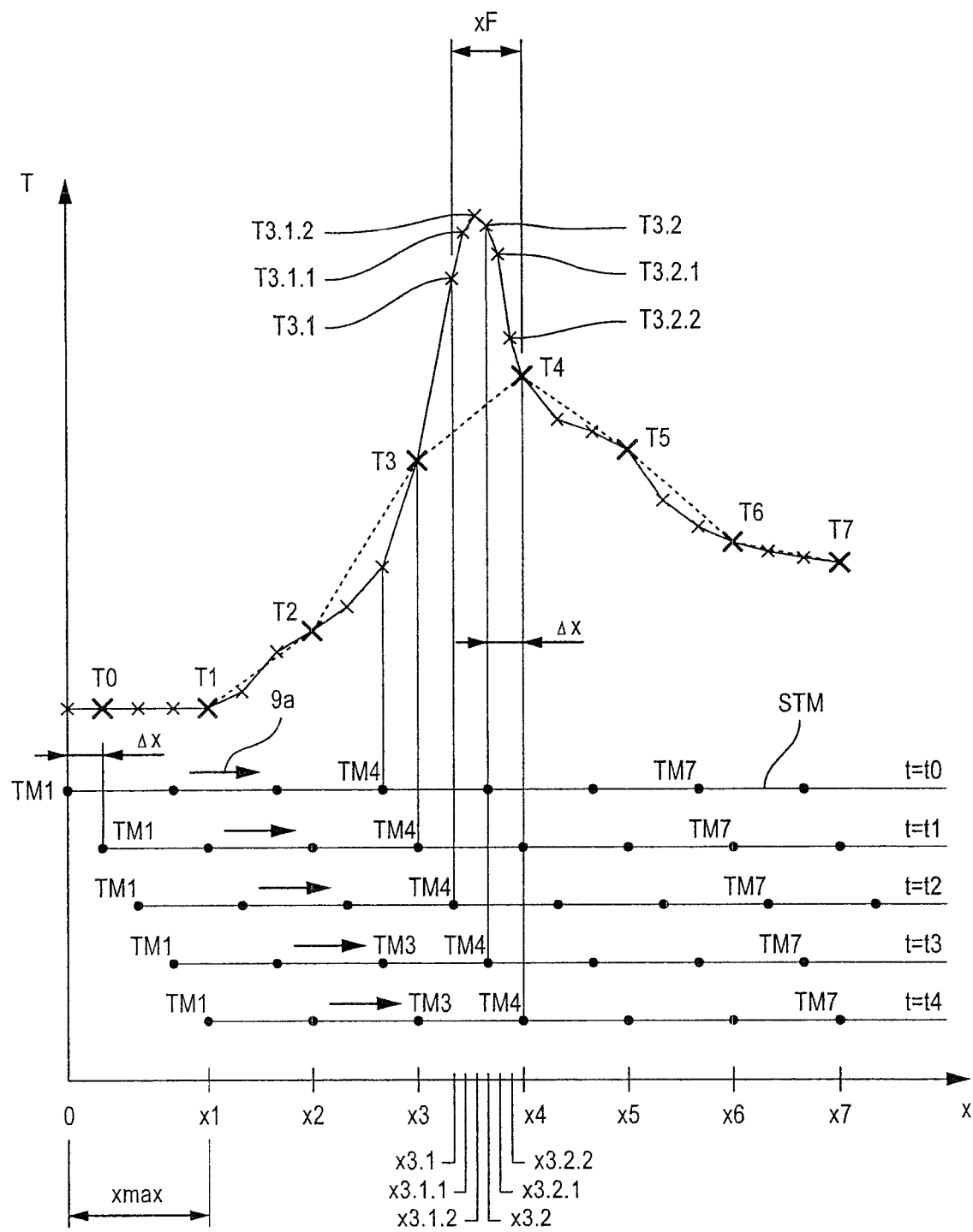
Figure 4:
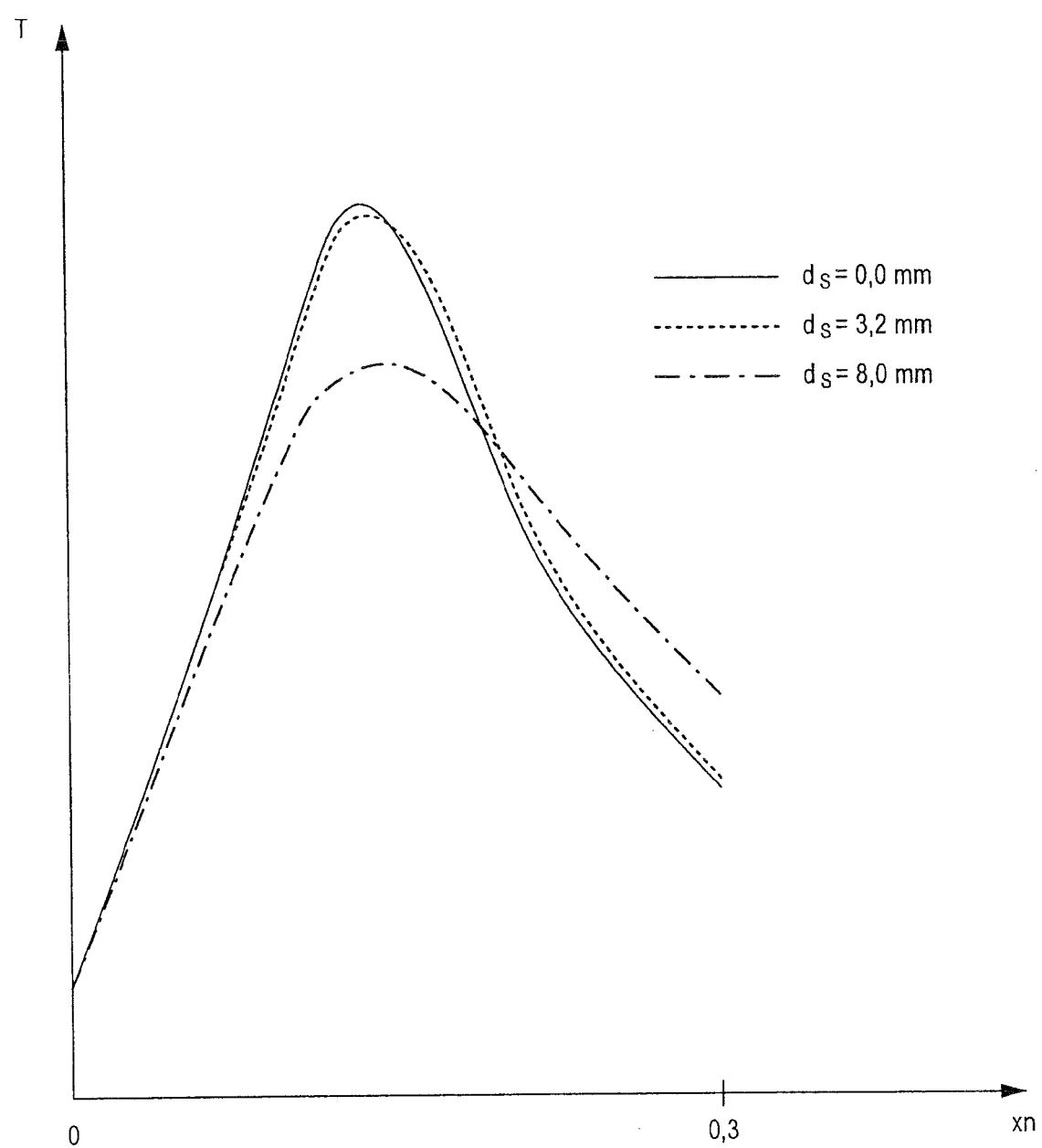
Figure 5:
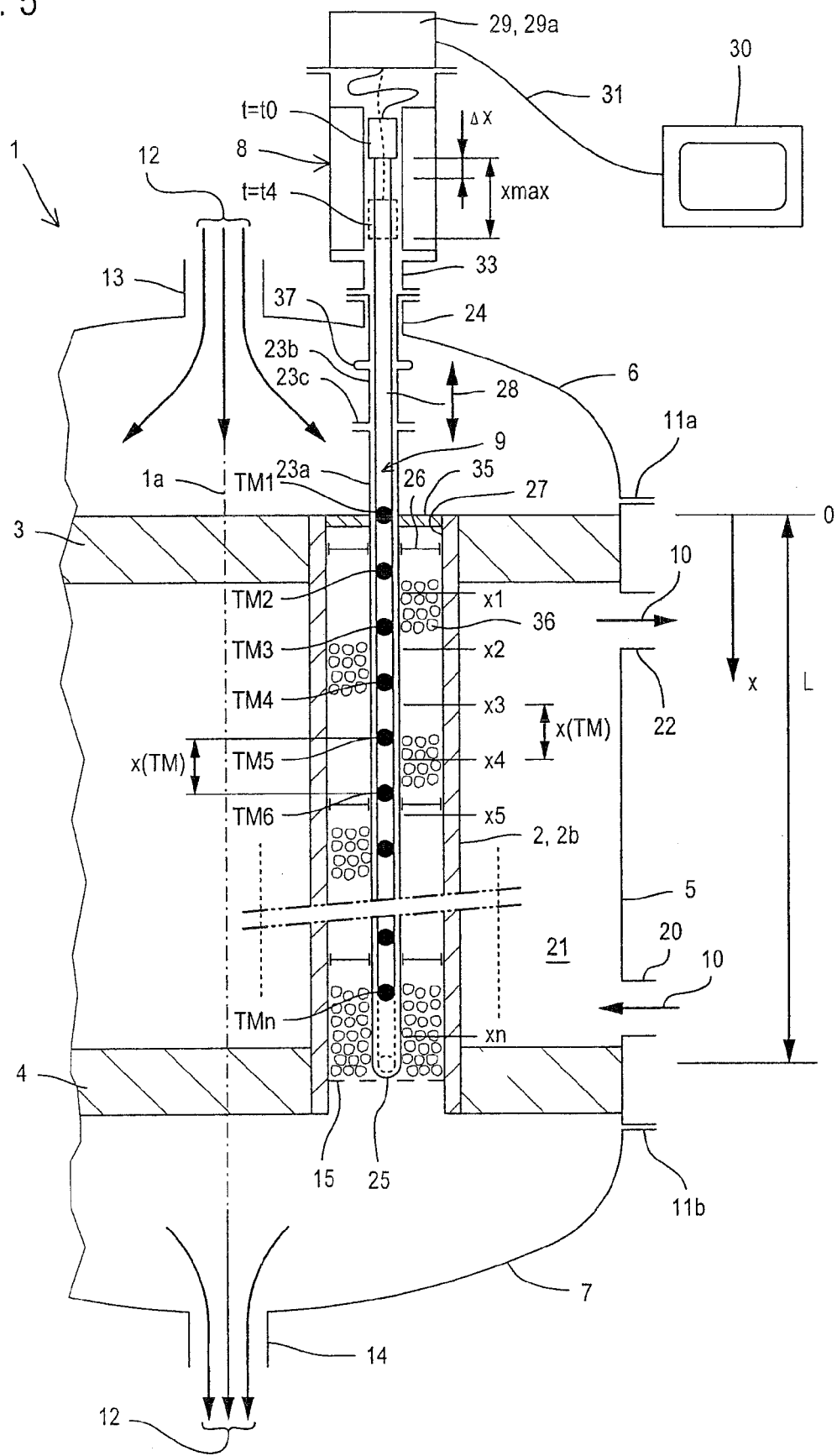
Figure 6:
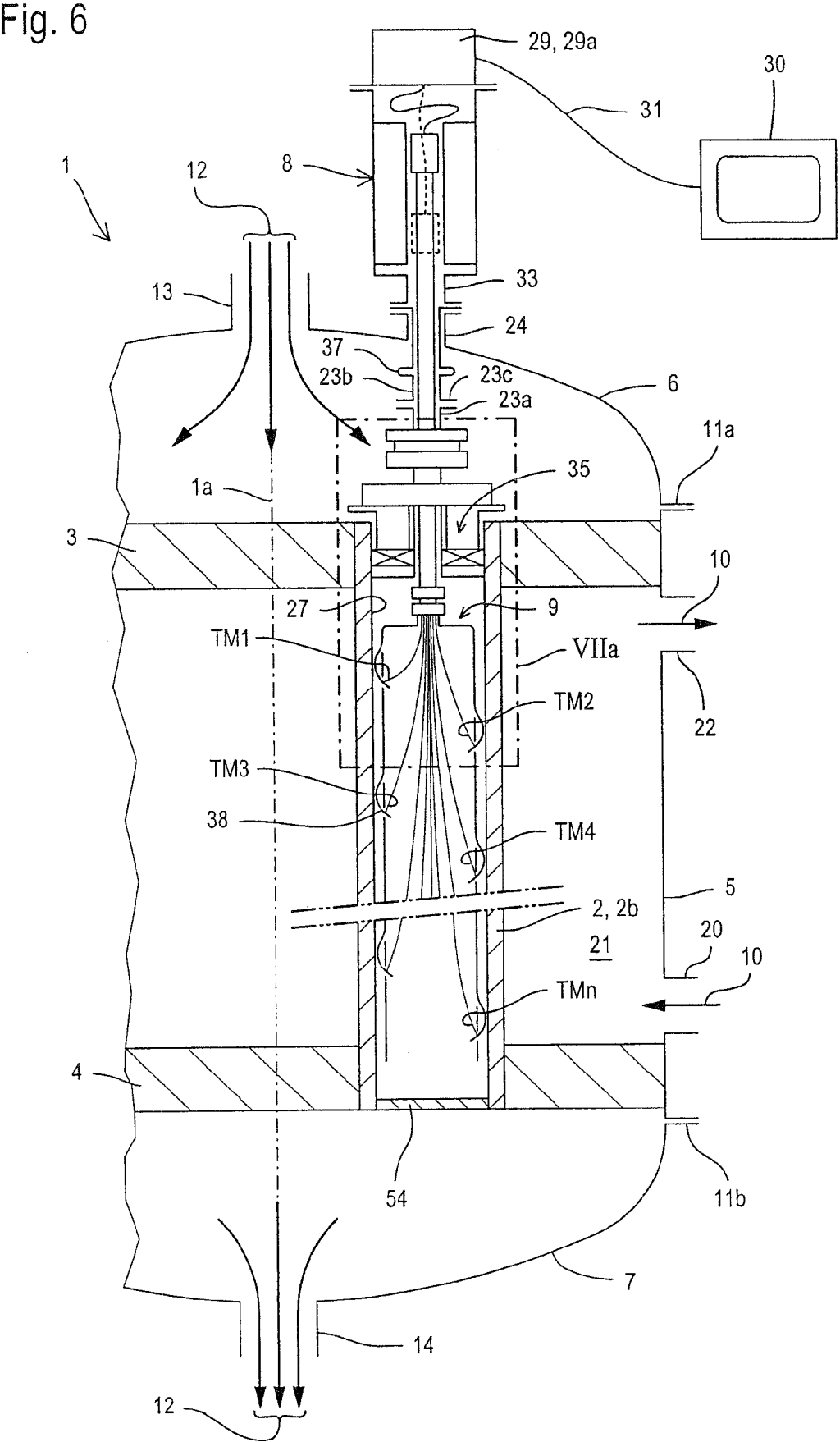
Figure 7A:
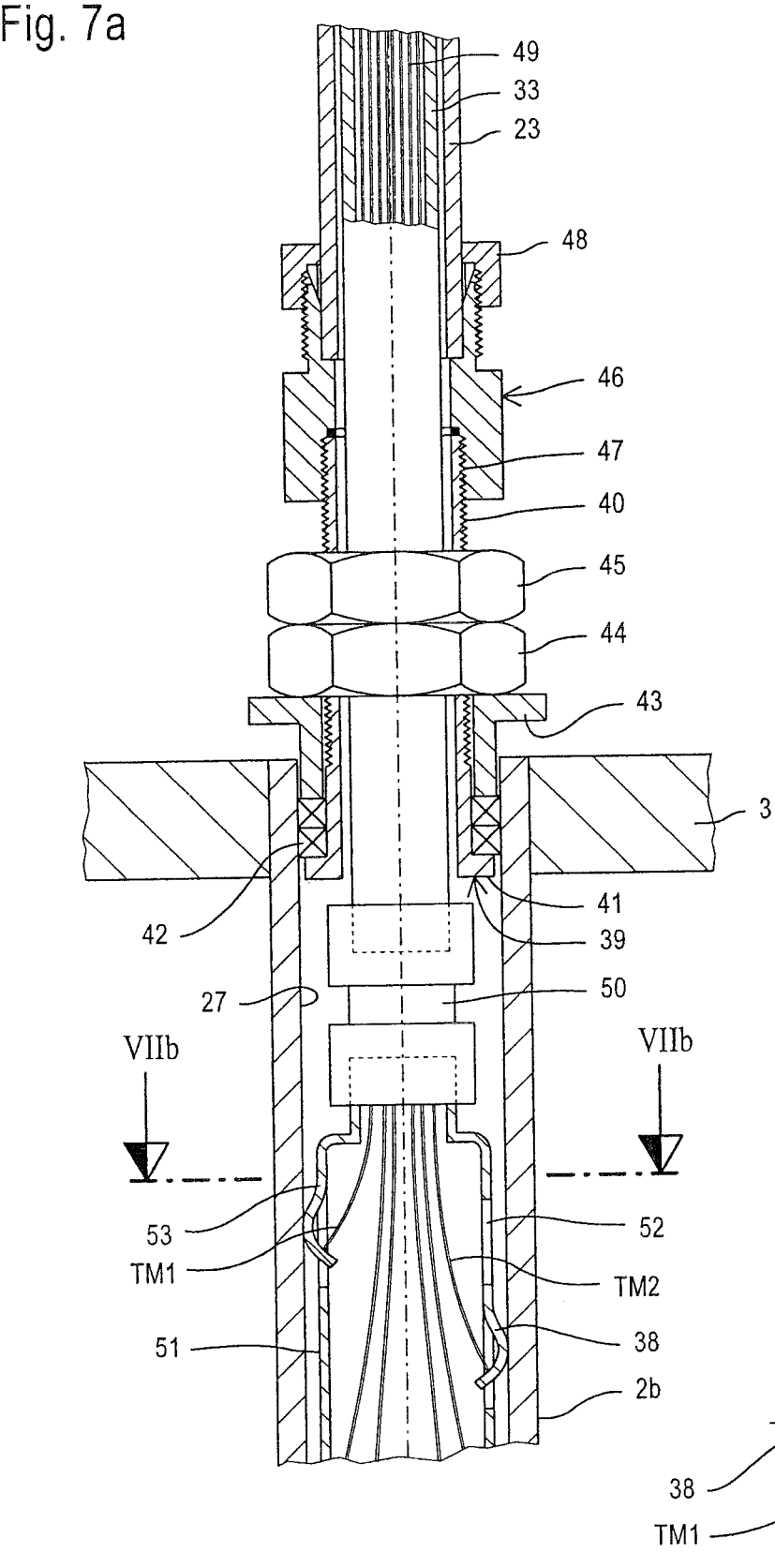

FIG. 3a, 3b each show temperature profiles of a stationary STM and a movable STM for comparison;

FIG. 4 shows temperature profiles obtained when using protective tubes of different outer diameters in a thermometer tube;

FIG. 5 is an illustration similar to FIG. 1, showing a first embodiment of a WT thermometer tube on an enlarged scale;

FIG. 6 is an illustration similar to FIG. 5, showing a second embodiment of a WT thermometer;

FIG. 7a shows cutout VIIa of FIG. 6 on an enlarged scale; and

Figure 7B:
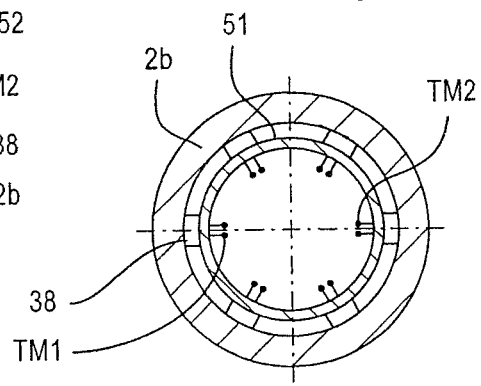

FIG. 7b is a cross sectional view along line VIIb-VIIb in FIG. 7a.

The embodiments of tube bundle reactors 1 according to the invention presented in the drawings comprise a bundle (not shown) of reactor tubes, at least one thermometer tube 2, an upper tube sheet 3 and a lower tube sheet 4, a shell 5, a gas inlet head 6 and a gas outlet head 7, and a mechanical positioning means 8. In the embodiments illustrated, the gas inlet head 6 is the upper reactor head and the gas outlet head 7 is the lower reactor head; they will also be referred to as such in the description below.

FIG. 1 diagrammatically shows a stage thermometer (STM) 9 in a KAT thermometer tube 2a of a tube bundle reactor 1 comprising a mechanical positioning means 8. No reactor tubes and just one KAT thermometer tube 2a are shown in the drawing, on an enlarged scale, for reasons of clarity. Reactor tubes and thermometer tubes 2 are cooled by a heat carrier 10 of a heat carrier system (not shown) which comprises a circulating pump, a cooler, a heater, baffle plates, and further component parts.

The embodiment illustrated is implemented as a single-zone tube bundle reactor 1 having a longitudinal axis 1a. The reactor comprises a plurality of reactor tubes (not shown) the structure of which is identical with that of the KAT thermometer tube 2a, shown enlarged in the drawing, but differing inasmuch as the reactor tubes contain only inert material and catalyst and no built-in parts. Both the reactor tubes and the KAT thermometer tubes 2a are fixed in sealing fashion in the upper tube sheet 3 and in the lower tube sheet 4. The tube sheets 3, 4 are joined to the cylindrical shell 5 along their circumferences. The upper gas inlet head 6 spans the upper tube sheet 3 being joined to it by means of an upper flange 11a; the lower gas outlet head 7 spans the lower tube sheet 4 being joined to it by means of a lower flange 11b. Reactor gas 12 is fed through a gas inlet nozzle 13 into the gas inlet head 6 and distributed to the upper tube sheet 3. It continuous to flow through the reactor tubes and KAT thermometer tubes 2a, respectively, exiting from the same into the gas outlet head 7, and leaving the reactor 1 through a lower gas outlet nozzle 14.

At its upper end, the KAT thermometer tube 2a is fixed in sealing fashion in the upper tube sheet 3, while its lower end is sealingly fixed in the lower tube sheet 4, flow communication thus is established with the gas inlet and outlet heads 6, 7. A particle support 15 for bulk material is arranged in the lower part of the KAT thermometer tube 2a; it is referred to as catalyst support 15 in the context of a KAT thermometer tube 2a. On this support rests a bed of inert material 16 which reaches up to the upper edge 17 of the lower tube sheet 4. On top of the inert material 16 there is a catalyst bed 18 extending upwards as far as the lower edge 19 of the upper tube sheet 3. It is likewise conceivable, for instance, to place the catalyst support 15 at the level of the upper edge 17 of the lower tube sheet 4 and dispose the catalyst 18 directly on top; but this is not illustrated in the drawing. The KAT thermometer tube 2a is cooled by a heat carrier 10 which, in the instant case, enters through a lower inlet 20 into the shell 21 of the reactor 1, leaving it through an upper outlet 22. A circulating means and a cooler are arranged outside of the reactor 1, they are not shown in the drawing.

A protective tube 23 positioned centrally inside the KAT thermometer tube 2a extends down to the catalyst support 15 and upwardly out of the gas inlet head 6. For easier mounting, the protective tube 23 comprises of two parts 23a, 23b which are interconnected by flanges 23c within the gas inlet head 6. Additionally, the protective tube 23 may be fixed (not shown) in the thermometer tube 2 and also be provided with a length compensating means in the area of the gas inlet head 6. In the instant embodiment, the upper part 23b of the protective tube 23 extends up to a measuring stub 24 in the gas inlet head 6. The lower part 23a of the protective tube 23 extends down to the catalyst support 15 where it is closed at its lower end 25. In the area of the KAT thermometer tube 2a, the protective tube 23 is supported laterally on the inside wall of the KAT thermometer tube 2a by means of spacers which, at the same time, center it in the KAT thermometer tube 2a. The stage thermometer STM 9 is inserted in the protective tube. The drawing shows it in its uppermost position. The STM comprises a plurality of thermometers TM1, TM2, TM3 etc. down to a final one TMn at the lower end. The STM 9 is axially movable back and forth (arrow 28) inside the protective tube 23.

In principle, the minimum measuring range may be selected freely. For reasons of clarity, however, it preferably reaches from one end x1 of the catalyst bed 18 to the other end xn of the catalyst bed 18. The minimum measuring range is subdivided into a plurality of small sections the size of which, again, in principle may be chosen at will. Nevertheless, in a preferred embodiment, one such section corresponds to the spacing between two adjacent individual thermometers x(TM).

The mechanical positioning means 8 moves the STM 9 in steps Δx within the protective tube 23. The maximum path of movement from a start position to an end position is the working traverse xmax. The distance from the first thermometer TM1 to the last thermometer TMn plus working traverse is designated L. The mechanical positioning means 8 is disposed on the upper reactor head 6 and releasably attached to the same.

A transducer 29 for measured values fastened to the mechanical positioning means 8 is furnished with a teletransmission means 29a which communicates with a remote control center 30. The measurement results and signals, respectively, are processed in the transducer 29 and transmitted by the teletransmission means 29a to the control center 30 which disposes of means for receiving and processing the measurement signals and also of means for controlling the mechanical positioning means 8. The measurement results are transmitted either by signal cables 31 or by radio.

Figure 2:
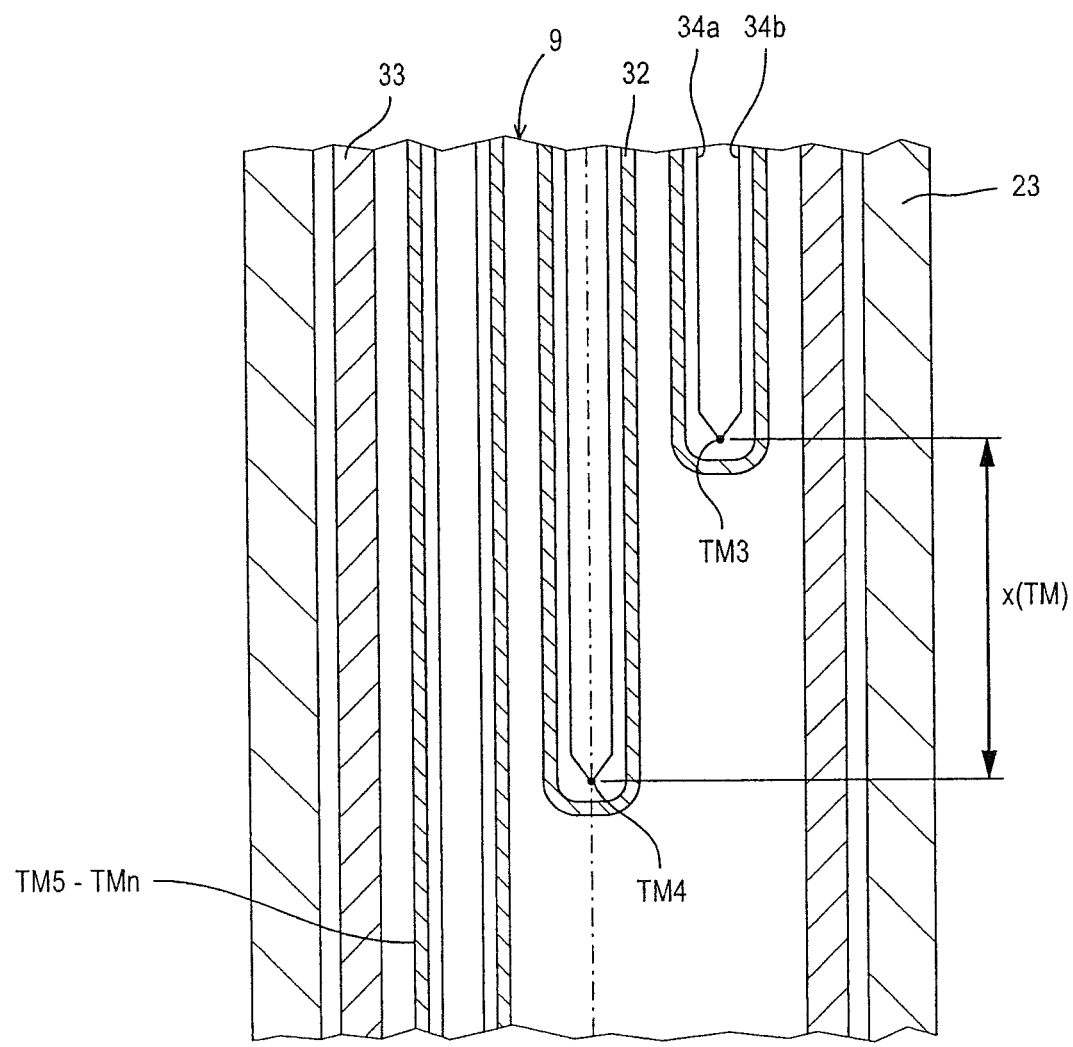
FIG. 2 is an enlarged presentation of cutout 11 of FIG. 1.

FIG. 2 is an enlarged sectional view of a stage thermometer 9, embodied here by a stage thermocouple, which is inserted in the protective tube 23. The drawing shows thermometers, more specifically, thermocouples TM3 and TM4. Each thermocouple is enclosed by a thermo sleeve 32, all the thermo sleeves being housed in a heat protection tube 33. The heat protection tube 33 in turn is disposed in the protective tube 23 and freely movable inside the same.

The two thermo electric wires 34a, 34b of a thermocouple, having their lower ends joined by soldering, are located within a thermo sleeve 32. The thermocouples are axially spaced from each other by a distance x(TM). They are combined in a bundle which is enclosed by the heat protection tube 33. This combined bundle of thermocouples in a heat protection tube 33 together form an STM 9. The resulting STM 9 is introduced into the protective tube 23. The heat protection tube 33 is joined, preferably detachably, with the mechanical positioning means 8.

In FIG. 3a the temperature profiles of a stationary STM (dotted line) and a movable STM 9 (continuous line) are plotted together in one diagram. The diagram presents approximately the first third of a KAT thermometer tube 2a. The hot spot is located in this first third of the tube. The temperatures measured here are those of an exothermic reaction.

Measuring positions x1 to x7 in thermometer tube 2a are plotted on the abscissa, while the temperatures measured T0, T1 to T7 are plotted on the ordinate, T0 designating the temperature measured from the uppermost thermometer TM1 on the way to the first measuring position x1.

The positions of the thermometers and thermocouples, respectively, TM1 to TM7 are plotted in parallel with the abscissa for times t0 to t4. Between these points in time, the movable STM 9 was displaced in the direction of arrow 9a by a distance $\Delta x$ each until completion of the overall path of displacement and working traverse xmax, respectively. In the embodiment shown, the working traverse xmax corresponds to the distance between the starting position 0 of the STM and measuring position x1 and equals four $\Delta x$. This path $\Delta x$ makes up one third of the distance between adjacent measuring positions x1, x2, x3, x4, x5, x6, x7 and, therefore, corresponds to the spacings between respective measuring positions x2, x2.1, x2.2, x3, x3.1, x3.2, and x4.

Thermocouple TM4 will be referred to in the description below as an example for explaining the measuring environment. The first temperature measurement takes place at time t=t0. At this point in time, the STM 9 is located at the uppermost position illustrated in FIG. 1. Thermocouple TM4 at this time is at measuring position x2.2, measuring temperature T2.2. Thereafter, at time t=t1, the STM9 is moved forward by one step $\Delta x$. That brings thermocouple TM4 to measuring position x3 to measure temperature T3. Accordingly, at times t=t2, t=t3, and t=t4 the thermocouple will be at measuring positions x3.1, x3.2, and x4, respectively, measuring temperatures T3.1, T3.2, and T4, respectively. When the point in time t=t4 comes, the working traverse xmax will have been fully run through once.

A comparison of positions indicates that, for example, at time t=t3 thermocouple TM3 measures the temperature at the same measuring position x2.2 at which thermocouple TM4 already took its measurement at time t=t0. If the measured values are the same that is an indication that the thermocouples being used are flawless and the condition is stationary. If, on the other hand, the measurement results differ and all the other thermocouples indicate the measured temperature values of the respective predecessor at time t=t0 this is an indication that thermocouple TM3 is faulty. If the deviation which results from all the other thermocouples is similar it means that the process currently is not stationary. In this manner, mutual checking of the thermocouples is realized. In the example chosen, the working traverse xmax was divided into four equal sections $\Delta x$. Adjacent measured values are connected by straight lines to express that the locations between the measured values in fact are unknown. It is evident that this subdivision still is rather coarse. In practice, a finer resolution and more subdivisions will be chosen to obtain a better approximation to the actual course of the temperature.

A comparison with the use of a stationary STM is shown at t=t4. Here, the values measured by the stationary STM are interconnected by discontinuous lines. These measurements offer a temperature maximum at x=x4 of T=T4. By contrast, applying the measures of the invention, the measuring method provides a temperature maximum at x=x3.2 of T=T3.2, i.e. a distinctly higher value. This demonstrates that the actual course of the temperature is detected much better.

FIG. 3b illustrates the application of a more refined method. Here, the working traverse xmax, to begin with, is passed through swiftly at a coarse step width $\Delta x$ according to the method shown in FIG. 3a, for example. The temperature maximum found with this quick procedure lies at x=x3.2 at T=T3.2. Starting from this temperature maximum, a fine measuring range xF is fixed. In the instant example it reaches from a step width $\Delta x$ before the temperature maximum to a step width $\Delta x$ after the same. This total fine measuring range is subdivided in the instant example into six equal part sections. The temperatures of the end points of these smaller part sections are measured in a manner analogous to the method described above. It is found that a temperature maximum T=T3.1.2 exists at x=x3.1.2, in other words slightly higher than T=T3.2 as obtained with the previous method. This means that suitable choice of the location of the fine measuring range xF can reduce the measuring range, whereby the part sections of the measuring range become smaller at a constant number of measurements per series of measurements, thus enhancing the resolution.

FIG. 4 illustrates three calculated temperature curves from an exothermic reaction, they are obtained by means of a reactor tube without built-in elements and two KAT thermometer tubes 2a having protective tube diameters dS which vary each, from the beginning of the tube up to 30% of the overall tube length. The reference curve is shown as a continuous line representing the course of temperatures in the reactor tube without interior elements (dS=0.0 mm). If a protective tube 23 having an outer diameter dS=3.2 mm is installed centrally in a KAT thermometer tube 2a this will have very little influence on the course of the reaction and thus on the development of heat (dotted line). But with a protective tube diameter dS=8.0 mm the influence becomes clearly visible (dash-dot line): the temperature maximum lies much lower and it becomes broader and is shifted further back in the direction of flow.

FIG. 5 is an illustration similar to FIG. 1; it shows a heat carrier (WT) thermometer tube 2b on an enlarged scale. This WT thermometer tube 2b substantially corresponds to a KAT thermometer tube 2a. An essential difference resides in the sealing 35 between the thermometer tube 2 and the protective tube 23 to prevent the entry of reaction gas 12 into the interior of the thermometer tube 2. In the embodiment shown, the space between the protective tube 23 and the inside wall 27 of the WT thermometer tube 2b is filled up with a material 36 which is a good heat conductor, such as granular aluminum or granular iron. In another embodiment, not illustrated, the protective tube 23 may be positioned eccentrically and close to the inside wall 27 of the WT thermometer 2b. In this case the remaining space inside the WT thermometer 2b is filled with insulating material 36 so that the STM 9 essentially takes direct measurement of the wall temperature of the WT thermometer tube 2b. In the area of the gas inlet head 6, the protective tube 23 disposes of compensating means 37 to make up for different lengthwise expansions.

FIG. 6 is an illustration similar to FIG. 5 presenting another embodiment of a WT thermometer tube 2b which comprises a plurality of thermometers embodied, preferably, by thermocouples. Thermal conductivity from the thermocouples to the inside wall 27 of the thermometer tube in this embodiment is provided by resilient elements 38.

The cutout marked VIIa in FIG. 6 is shown in greater detail in FIGS. 7a/b. The sealing 35 of the annular space between the protective tube 23 and the inside wall 27 of the thermometer tube is embodied by a stuffing box (gland) structure. The function thereof is optimized by subdividing the sealing area into several individual portions. The central element of the seal is a support sleeve 39 the lower part of which reaches into the WT thermometer tube 2b and the central and upper parts of which are formed with extremal threads 40. At the lower end of the support sleeve 39, an outwardly directed collar 41 is formed to serve as abutment for a stuffing box (gland) packing 42. The stuffing box (gland) packing 42 is compressed by a plunger 43. The force required to accomplish that is applied by a nut 44 screwed onto the extremal thread 40 of the support sleeve 39. The position of the nut 44 is secured, in the example shown, by a counternut 45. The extremal thread 40 of the support sleeve 39 extends upwardly for some distance beyond the counternut 45. A connecting piece 46 formed at its low end with a screw-on thread 47 is screwed onto the upper end of the thread 40. The upper end of the connecting piece 46 is devised as a clamping or cutting ring screw connection 48 and it is here that the protective tube 23 proper is joined to the connecting piece. On its length from the WT thermometer tube 2b to the mechanical positioning means 8, the protective tube 23 is provided with compensating means 37 and, if desired, with further releasable connections 23c.

A heat protection tube 33 through which signal cables 49 of the thermocouples TM1 to TMn pass to the outside of the reactor 1 extends through the protective tube 23 and onwards through the connecting piece 46 and the support sleeve 39. At its lower end, the heat protection tube 33 is joined by a double-sided clamping or cutting ring screw connection 50 to the STM 9 which, in the instant embodiment, is designed as a stage thermocouple. The STM 9 comprises a guide tube 51 formed with a plurality of resilient elements 38 which are in heat contact with the inside wall 27 of the thermometer tube. Such a resilient element 38 may be formed, as shown, by making a hole 52 in the guide tube 51. A punch then may be moved through this hole 52 to punch a resilient element 38 out of the opposite side of the guide tube while, at the same time, preserving a link 53 with the guide tube 51. Subsequently, a thermocouple (e.g. TM1) is fastened to the inside of the resilient element 38. This manufacturing procedure is repeated several times at different axial levels, making sure that the thermocouples TM1 to TMn will be offset uniformly in radial direction, as shown in FIG. 7b. Hereby, the guide tube 51 is centered radially in the middle of the WT thermometer tube 2b. Although not shown, the resilient elements 38 may be formed in a different manner, namely by attaching previously prepared resilient elements to the outside wall of the guide tube 51, e.g. by electrical spot welding. In this case, too, a hole 52 in the guide tube 51 is advantageous so as to make the thermocouple accessible. Moreover, for example, a receiving spot for adequate connection of a thermocouple may be formed on the previously prepared resilient element 38. This would provide great simplification of the manufacturing process.

The lower end of the WT thermometer tube 2b, preferably, is closed by a tight closure or a perforated closure 54.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What we claim is:

1. A tube bundle reactor for carrying out endothermic or exothermic gas phase reactions, comprising
    a tube bundle of reactor tubes filled with catalyst, having their ends fastened tightly in tube sheets, a fluid heat carrier flowing around the tubes during operation,
    a shell enclosing the tube bundle,
    a gas inlet head spanning one of the tube sheets,
    a gas outlet head spanning the other tube sheet,
    the reactor tubes being in fluid communication with the gas inlet and outlet heads,
    at least one stage thermometer installed in a thermometer tube disposed in the tube bundle for determining temperature profiles,
    wherein the at least one stage thermometer (9) is axially movable inside the thermometer tube (2), and the tube bundle reactor (1) comprises a mechanical positioning means (8) to effect the axial movement of the stage thermometer (9) in predetermined steps, and the at least one stage thermometer (9) comprises a teletransmission means (29a) adapted to transmit the measured values to a remote control center (30), and that the mechanical positioning means (8) comprises means for the reception of control signals from that control center (30); and
    wherein the at least one stage thermometer (9) in the thermometer tube (2) is arranged inside a protective tube (23); and
    wherein the at least one stage thermometer (9) inside the protective tube (23) is arranged in a heat protection tube (33) which is axially movable in the protective tube (23); and
    wherein the thermometer tube is in fluid communication with the gas inlet head (6) and the gas outlet head (7) and comprises a catalyst therein, the reactive effect of which corresponds to that of the reactor tubes, and that the protective tube (23) extends through at least part of the catalyst, and the heat protection tube (33), including the at least one stage thermometer (9) passes and is movable through, respectively, at least part of the catalyst; and
    wherein the spacings (x(TM)) of adjacent individual thermometers (TM) of the at least one stage thermometer (9) are smaller in the area of a hot spot than in the remaining area.

2. The tube bundle reactor as claimed in claim 1, wherein the at least one stage thermometer (9) comprises individual thermometers (TM) ranging in number from 2 to 50, the individual thermometers (TM) being positioned at a predetermined axial spacing (x(TM)) from each other.

3. The tube bundle reactor as claimed in claim 1, wherein the at least one stage thermometer (9) is a stage thermocouple.

4. The tube bundle reactor as claimed in claim 1, further comprising at least one additional thermometer tube disposed in the tube bundle and including a stage thermometer which is not axially movable, the share of thermometer tubes (2) including axially movable stage thermometers (9) in the overall number of thermometer tubes being less than 100%.

5. The tube bundle reactor as claimed in claim 1, wherein the protective tube (23) is disposed on the tube axis of the thermometer tube (2).

6. The tube bundle reactor as claimed in claim 5, wherein the protective tube (23) is supported by spacers (26) against the inside wall (27) of the thermometer tube (2).

7. A tube bundle reactor for carrying out endothermic or exothermic gas phase reactions, comprising
    a tube bundle of reactor tubes filled with catalyst, having their ends fastened tightly in tube sheets, a fluid heat carrier flowing around the tubes during operation, a shell enclosing the tube bundle,
a gas inlet head spanning one of the tube sheets,
a gas outlet head spanning the other tube sheet,
the reactor tubes being in fluid communication with the gas inlet and outlet heads,
at least one stage thermometer installed in a thermometer tube disposed in the tube bundle for determining temperature profiles,
wherein the at least one stage thermometer (9) is axiall movable inside the thermometer tube (2), and the tube bundle reactor (1) comprises a mechanical positioning means 8 to effect the axial movement of the stage thermometer (9) in predetermined steps, and the at least one stage thermometer (9) comprises a teletransmission means (29a) adapted to transmit the measured values to a remote control center (30), and that the mechanical positioning means (8) comprises means for the reception of control signals from that control center (30); and
wherein the thermometer tube is tightly sealed with respect to the gas inlet head (6), the stage thermometer (9) extending throughout the thermometer tube and being axially movable therein.

8. The tube bundle reactor as claimed in claim 7, wherein the at least one stage thermometer (9) in the thermometer tube (2) is arranged inside a protective tube (23), and wherein the space between the outside of the protective tube (23) and the inside wall (27) of the thermometer tube is filled with thermally conductive inert material (36).

9. The tube bundle reactor as claimed in claim 7, wherein the at least one stage thermometer (9) is in direct contact with the inside wall (27) of the thermometer tube.

10. The tube bundle reactor as claimed in claim 7, wherein the at least one stage thermometer (9) comprises at least one thermally conductive spring element (38) which contacts the inside wall (27) of the thermometer tube.

11. The tube bundle reactor as claimed in claim 1, wherein the mechanical positioning means (8) comprises a stepping motor.

12. The tube bundle reactor as claimed in claim 1, wherein the mechanical positioning means (8) is adapted to be operated in a plurality of steps and measuring positions by means of manual control and/or a control program.

13. The tube bundle reactor as claimed in claim 1, wherein the mechanical positioning means (8) is devised to move the at least one stage thermometer (9) through a maximum working traverse (xmax) which equals up to 300% of one spacing x(TM) between adjacent individual thermometers (TM).

14. The tube bundle reactor as claimed in claim 1, wherein the mechanical positioning means (8) is made explosion-proof in accordance with safety requirements in force at the place of erection.

15. The tube bundle reactor as claimed in claim 1, wherein the protective tube (23) is made of at least two parts (23a, 23b) which are detachably interconnected within the gas inlet or outlet head (6, 7).

16. The tube bundle reactor as claimed in claim 1, wherein the protective tube (23) is closed at its end (25) remote from the mechanical positioning means (8).

* * * * *